3,272,645
MOLDABLE LAMINATED SHEET MATERIALS AND METHOD OF MAKING SAME

Marcel Duhoo, Bruay-en-Artois, Robert Fourcade, Gosnay, Claude Haberer, Houdain, and André Mennessier, Bethune, France, assignors to Houillères du Bassin du Nord et du Pas-de-Calais, Douai, France, a French public establishment
No Drawing. Filed Sept. 22, 1960, Ser. No. 57,641
Claims priority, application France, Sept. 29, 1959, 806,262; Nov. 7, 1959, 809,612
10 Claims. (Cl. 117—33)

The present invention relates to laminated sheet materials which can be stored, stacked, and deeply molded under heat and pressure, and to a method of producing them.

It has been proposed to manufacture laminated sheet material consisting of a base of woven or non-woven fabric or of mats of widely differing types of fiber, and in particular of glass fiber, and a thermoplastic or thermosetting binder; in the latter case, the use of unsaturated, cross-linkable, liquid polyester resins has been suggested.

The disadvantages of these sheet materials arise from the nature of the binders proposed. When the binder is liquid, the sheet materials are very difficult to handle, they cannot be stacked because they adhere to one another, and it is difficult to mold them homogeneously under pressure because the liquid tends to drain through the fabric. Moreover, in the case of the aforesaid polyester resins, the sheet materials cannot be stored because they are not stable since the resin tends to be converted into the hard cross-linked form under the influence of the catalyst which the sheet materials contain.

It has also been suggested that a solid binder should be used at normal temperature (Bakelite, solid polyesters, epoxy resins etc.), the binder being applied to the base in the fused state at a lower temperature than that which causes cross-linking. This method of operation renders molding of the sheet materials expensive, either because of the slow rate of operation and the high pressures and temperatures which must be used or because of the cost of the resins employed.

If a mixture of the above-mentioned liquid and solid binders is used, it comprises the total of their individual disadvantages.

In French Patent 1,113,814 a technique is described which enables unsaturated cross-linkable polyester resins to be obtained in a new state, namely a stabilized state of intermediate cross-linking in which they appear in a form hereinafter designated by the term "gel," it being understood that this form, in a manner analogous to honey, may range from a viscous liquid to relatively rigid moldable jelly.

The use of these "gels" for coating the aforesaid bases has already been suggested, the stable coated webs thus obtained being capable of being stored until they are subsequently molded under heat and pressure. It has likewise been suggested that these "gels" should be used for the same purpose in the form of "compounds" comprising various fillers and fibers introduced, for example, in the course of the process of obtaining the gel.

In these two known processes, therefore, polyester "gels" and thermosetting moldable compositions of gelled polyesters ("compounds") have been used for the coating of woven and non-woven webs formed from mineral, vegetable and/or organic fibers to produce thermosetting intermediate industrial products.

An object of the present invention is to improve this latter method of coating in order to obtain webs, the external appearance and consistency of which are substantially similar to those of rubberized fabrics or webs covered with a thermoplastic resin.

According to the invention, the webs or bases are coated with polyester "gels" containing no fillers or with "compounds" of polyester gels as defined above and the coated webs are dusted on at least one face with a finely divided solid powder. This dusting may subsequently be followed by air drying.

Webs are thus obtained, the feel of which is dry and non-adhesive. The webs prepared according to the invention retain their full flexibility and they may be stacked or rolled up without running the risk of the various portions adhering to one another.

A further advantage of this technique is to permit the use of bases which, in themselves, are fragile and difficult to handle such as mats edged or chequered with ribbons, webs of parallel continuous glass filaments with various orientations in superimposed webs or in combination with mats included between such webs or between light woven fabrics. In this connection, it may be noted that a fundamental advantage of the present method is the possibility which it affords of using webs of continuous filaments instead of woven fabrics. Continuous glass filaments have a cost price three to six times lower than woven fabrics made up of glass fibers of comparable quality. It is essential to note that the present method not only enables such filaments to be used but also the use of glass filaments of inferior quality such as alkaline glass, the cost of which is 20 times lower than the cost of glass cloth. In other words, referring to the cost per kilogram, in a material of reinforced polyester, the cost of the glass cloth in relation to the cost of the polyester is of the order of 3 to 10 times whereas the cost of the continuous filaments which can be used in the present method is less than half.

It will be understood that applications for which reinforced polyesters are technically excellent but for which they have scarcely been used industrially hitherto because of their cost, which is, in practice determined by the cost of the glass fabric, are now within reach of the user as a result of the present method which enables a reinforcing material 10 to 20 times less expensive to be used.

A very important advantage of the webs of parallel continuous filaments which can be used as a result of the method of the invention, is that the various combinations of non-woven coated webs thus obtained more easily assume the shape of molds and so deeper pressings and a more complicated and/or a more delicate relief can be obtained than with webs consisting of woven fabrics, and molded materials having improved mechanical properties are obtained as a result of the fact that the filaments remain intact under the stress of deformation.

The method according to the invention in no way modifies the polymerization conditions of the coated material obtained; indeed it improves the physico-chemical properties and in particular the properties of chemical inertness in the webs obtained.

The powders used to effect the dusting of the coated web may conveniently be divided into the following categories:

(a) Inert mineral or organic materials;
(b) Thermosetting resins;
(c) Thermoplastic resins which are fusible under the conditions for the final polymerization of the web.

Suitable materials within each of these categories are, for example, as follows:

Materials in category (a): talcum, a metal carbonate such as that of calcium and barium, barium, sulphate, silica; silicates; powdered metals such as aluminum and zinc; powdered materials normally used as fillers and/or pigments in cements, paints and varnishes; and metallic stearates and organic phosphates.

Materials in category (b): solid polyesters such as ethylene glycol fumarate, fumaric or maleic co-polyesters with phthalic acids (ortho- and/or iso- and/or tere-), prepolymerized allyl esters, such as diallyl phthalate, melamine resins, phenolformaldehyde resins and urea-formaldehyde resins.

Materials in category (c): high or low pressure polyethylene, polypropylene, polyolefins in general, copolymers of polyolefins and vinyl monomers, polyvinyl acetate, polyvinyl chloride, polyvinyl alcohol, cellulose acetate, polystyrene, polyformaldehydes, polycarbonates, polyacrylonitrile and polymethacrylate.

Mixtures of materials from different of the three categories may be used, and the powder used may be colored or not according to the final end use to which the coated web is to be put.

In carrying out the method according to the invention, both faces of the coated web may be dusted simultaneously or alternately with the same powder or the same mixture or with two different powders or mixtures; in particular, when it is desired to obtain webs adapted to be welded together, one of the faces should be dusted with materials selected from categories (a) or (b). The powders in category (a) behave like simple fillers, some improve the physico-chemical properties, while others plasticize the material.

The powders in category (b) disappear in the course of the final polymerization in the constituents of the gel with which they are miscible and with which they are polymerized.

The powders in category (c) melt under the conditions of the polymerization and thus remain at the surface or in the vicinity of the surface of the finished article in which they can confer certain physico-chemical properties, such as surface chemical inertness to solvents or certain chemical reagents.

The use of a mixture of powders in categories (a) and (b) may lead to surfaces to which paints adhere better.

A particularly advantageous means of carrying out the method according to the invention consists in pouring an excess of powder onto the faces of the web coated with gel, either alternately or simultaneously, by means, for example, of a vibrating device fed by means of a jigging table, which spreads the powder evenly and recirculating, for fresh dusting, the excess which falls from the web on changes in direction of the rollers used.

Needless to say, any other dusting means ensuring a uniform distribution may be used to carry out the method.

The proportion of powder to be used in relation to the gel coating the web depends essentially on the nature and density of the gels used and on the nature of the fabrics. Spongy or absorbent fabrics require less powder than those where the gel remains at the surface. This proportion further depends on the weight under which the webs are stacked in practice, the length of time it is required to store the coated fabrics, the temperature at which they are to be stored and the desired consistency of the material. In general, this proportion of powder relative to the gel is from 2 to 30%, and preferably from 5 to 20%, of the quantity of gel used.

The air drying which may follow the dusting of the coated web is preferably carried out at a temperature of from 15 to 70° C. For spongy and absorbent fabrics, the duration of this drying may be in the neighborhood of 2 minutes if it is effected with heating and 60 minutes if it is carried out at ambient temperature. For non-spongy fabrics, the drying time is substantially two to four times greater. The preferred method of drying consists in using dry air at 40° C.

It is frequently an advantage to roll the coated and powdered webs once or several times between rollers before storing them; moreover, it is frequently an advantage to follow each rolling with a fresh dusting.

In certain cases, and particularly when the manufacturer of the web is the user or when the ambient temperature is low, the drying operation may be omitted. The method is then reduced simply to dusting or to dusting followed by rolling and re-dusting.

The choice between these various possibilities depends on the following factors:

Nature and degree of consistency of the coating gel;
Thickness of the web to be coated;
Type of the fabrics to be coated;
Weight under which the stacking of the webs will take place;
Length of time the coated webs will be stored;
Temperature at which they will be stored;
And finally the desired consistency of the finished material.

A coated web produced according to the invention is easy to handle, to store and to use. The equipment used for the subsequent polymerization is automatically lubricated as a result of the dusting; when polymerization is carried out under heat and pressure, there is no risk of adhesion to the walls of the molds as the webs are dusted.

If materials in categories (a) or (b) are used for dusting, either alone or in admixture, it is possible to weld a plurality of sheets together simply by heating under pressure. The user can thus standardize the thickness of the webs to be stored or can join two or more of the webs together in order to obtain a particular finished article.

The most striking variations in the characteristics of the products manufactured according to the invention are given below, by way of illustration:

(1) The effect of the degree of fineness of the powder used on the amount of powder necessary to obtain the desired surface effect has been studied for a laminate of constant thickness. The desired surface effect is one of having a dry and non-adhesive feel.

The powder taken as an example was composed of ethylene-glycol fumarate. The sieves used are in accordance with the ASTM 11 standards. The coated web consisted of a verrane base weighing 0.680 kg./m.$^2$ which had received 0.680 kg. of gel per square millimeter of verrane ("verrane" is a warp-and-weft woven fabric in which both the warp and the weft consist of very long glass filaments). The gel was a polyester composed of:

100 parts of the mixture;
4 moles of ethylene-glycol;
1 mole of propylene glycol;
3 moles of maleic acid;
2 moles of phthalic anhydride, and
40 parts of styrene.

This gel was brought to the consistency of 0.08 kg., this consistency being calculated by the weight in kg. of material flowing in 100 seconds through the calibrated aperture of the device described in ASTM standard 1955 under reference ASTM D1238–525 under a load of 3.160 kg. at 20° C., 12 hours after the preparation of the gel.

The desired surface condition was obtained in every case by a single dusting without rolling.

| Grain size of the powder comprised between sieves No.— | Percent by weight of powder in relation to a laminate of constant thickness, necessary to obtain the desired surface effect |
|---|---|
| 60 and 100 | 9.3 |
| 100 and 120 | 6.15 |
| 120 and 140 | 4.2 |

The results show that the finest powder was the most effective. Moreover, the desired surface effect is obtained with a percentage of powder which is substantially inversely proportional to the thickness of the coated web to be protected.

(2) The influence of the porosity of the base fabric of the web (nature of the fiber) was studied. The powder used by way of example was, in this case, commercial talcum, 100% of which passed through sieve No. 170. The gel and the nature of the polyester were the same as above under (1).

|  | Verrane | Roving |
|---|---|---|
| Coated surface (to be dusted on both faces), m.² | 0.5 | 0.5 |
| Weight of glass, g | 160 | 225 |
| Weight of gel, g | 160 | 200 |
| Weight of powder necessary to obtain the same surface effect in each sample, g | 13 | 36 |

The results show that the spongy fabric (verrane) requires less powder than the non-absorbent fabric (roving).

(3) The influence of the constitution of the web (type of the web) was studied.

In the six examples which follow, coating was carried out with the same gel composition as before, brought to the same consistency (0.08 kg.), while cold, by two successive calenderings between cold rollers. When a plurality of webs were superimposed, they were recalendered in the same manner with the addition of a small amount of gel during re-calendering. These webs were dusted according to the method of the invention with 6% by weight, in relation to the coated product, of powdered ethylene-glycol fumarate with a fineness comprised between sieves Nos. 100 and 140. In the six examples, the sheets from which samples were cut out for drawing, were molded by heating to 130° C. under a pressure of 20 kg./cm.² for 20 seconds. The sheets all had a dry, non-adhesive feel.

*Example 1*

Tests carried out on a laminate consisting of two webs of parallel filaments coated and superimposed with the filaments of the webs extending at 90°.
  Construction of a web: 5 threads per cm.;
  Glass thread count: 60 ends;
  Roving TSR;
  Characteristics of the polymerized laminate:
  Weight of glass to m.² of coated fabric: 2.080 kg.;
  Weight of gel to m.²: 1.400 kg.;
  Thickness of the polymerized laminate: 1.5 mm.;
  Average resistance to tension in both directions (tests on samples of 100 mm. effective length; width 20 mm.) 55 kg./mm.².

*Example 2*

Tests carried out on a laminate consisting of two webs of parallel filaments, one of which was coated and the other dry and applied to the first web with the filaments extending at 90°.
  Construction of a web: 5 threads per cm.;
  Glass thread count: 60 ends;
  Roving TSR;
  Characteristics of the polymerized laminate:
  Weight of glass to the m.²: 2.080 kg.;
  Weight of gel to the m.²: 0.800 kg.;
  Thickness of the polymerized laminate: 1.3 mm.;
  Average resistance to tension:
  In the direction of the impregnated threads: 50 kg./mm.²;
  In the direction of the dry filaments: 40 kg./mm.².

*Example 3*

Tests carried out on a laminate reinforced by a coated mat placed between two webs of parallel filaments:
  Construction of a web: 5 threads to the cm.;
  Thread count: 60 ends;
  Nature of the mat: mat weighing 600 g./m.²;
  Characteristics of the polymerized laminate:
  Weight of glass to the m.²: 2.680 kg.;
  Weight of resin to the m.²: 2.00 kg.;
  Thickness of the laminate: 2.5 mm.;
  Average resistance to tension:
  In the direction of the filaments of the web: 45 kg./mm.²;
  Perpendicular direction: 3 kg./mm.².

*Example 4*

Tests carried out on a laminate reinforced with a glass fabric, equivalent in weight per square millimeter to that in Example 1.
  Type of fabric: Roving cloth No. 15;
  Characteristics of the polymerized laminate:
  Weight of glass to the m.²: 1.985 kg.;
  Weight of gel to the m.²: 1.100 kg.;
  Thickness of the laminate: 1.75 mm.;
  Average resistance to tension:
  Warp direction: 12 kg./mm.²;
  Weft direction: 25 kg./mm.².
  NOTE: Results inferior to those in Example 1 despite the higher proportion of glass/resin.

*Example 5*

Tests carried out on a laminate reinforced with a glass fabric having the same cost per m.² as that in Example 1.
  Type of the fabric: Roving cloth No. 13;
  Weight of the m.²: 0.350 kg.
  Weight of gel to the m.²: 0.350 kg.;
  Thickness of the laminate: 0.7 mm.;
  Average resistance to tension:
  Warp direction: 18 kg./mm.²;
  Weft direction: 15 kg./mm.².
  NOTE: The results are inferior to those per m./m.² in Example 1 and bearing in mind the thickness of the laminate obtained it will be seen that for the same cost of glass, the results in Example 1 are greatly superior to those in Example 5.

*Example 6*

Tests carried out on a laminate reinforced with a coated mat between two woven fabrics.
  Type of fabric: Roving 12;
  Weight to the m.² of fabric: 0.995 kg.;
  Weight of mat to the m.²: 0.600 kg.;
  Polymerized finished product:
  Weight of glass/m.²: 2.590;
  Weight of resin/m.²: 1.900 kg.;
  Thickness of the laminate: 2.5 mm.;
  Average resistance to tension:
  Warp direction: 20 kg./mm.²;
  Weft direction: 18 kg./mm.².

These six examples illustrate the influence respectively
  Examples 1–2: of webs of parallel filaments;
  Examples 4–5: of webs of known fabrics;
  Examples 3–6: of webs of mats between two woven fabrics.

It is clear from these examples that the invention enables various types of web to be used substantially at will, and in particular, enables webs of parallel filaments, which practically could not be used hitherto because of their constitution, to be used to give products which are equivalent to or often superior to those obtained with woven webs.

In every case, in the non-polymerized laminates thus constituted, the impregnating polyester does not drain away under compression, thus giving the finished cross-linked article a great homogeneity, the shrinkage in the course of the cross-linking is less than with liquid polyesters, hence the possibility of making articles of varying thickness, and, above all, the webs can be stacked, stored without becoming stuck together, easily handled but can nevertheless be welded together on molding to obtain articles of a desired thickness.

(4) The influence of the consistency of the gel was studied. The powder was ethylene glycol fumarate, the particle size of which is comprised between sieves Nos. 100 and 140. The polyester was the same as that described under (1). The fabric used was a verrane weighing 0.680 kg./m.$^2$. The consistency of the gels used, calculated as indicated under (1) was respectively:

Gel A 0.400 kg.
Gel B 0.250 kg.
Gel C 0.080 kg.

|  | Gel A | Gel B | Gel C |
|---|---|---|---|
| Surface coated (to be dusted on both faces), m.$^2$ | 0.5 | 0.5 | 0.5 |
| Weight of glass, g | 340 | 340 | 340 |
| Weight of gel, g | 320 | 330 | 340 |
| Weight of powder needed (as percent by weight of the coated laminate) | 7.9 | 7.1 | 5.20 |

(5) The physico-chemical improvements obtained with various powders on the finished polymerized material was studied.

The gel and the nature of the polyester were identical with those of the polyester mentioned under (1) above.

In each case, a comparison was made with an identical coated web which had not been dusted at all and which had been polymerized under the same conditions:

| Storing the finished material in: | Type of powder used to protect the coated web | Percent of powder used (in relation to the laminate) | Loss or gain in weight by the finished laminate in percent after standing for 192 hours at 20° C. | |
|---|---|---|---|---|
| | | | Laminate previously dusted | Laminate undusted |
| Distilled water | Ethylene glycol fumarate | 5 | +0.15 | +1.4 |
| 10% solution of HCl | do | 5 | +0.5 | +1.1 |
| Do | Urea formaldehyde | 4 | −0.2 | +1.1 |
| 1% aqueous solution of NaOH | Low pressure polyethylene | 5.5 | +0.1 | −1.15 |
| 10% aqueous solution of NaOH | do | 5.5 | +3.8 | +8.6 |
| Aqueous solution of NaOH | Ethylene glycol fumarate | 5 | +2.5 | +12.5 |
| 10% nitric acid | Urea formaldehyde | 4 | −0.11 | +1.5 |
| Saturated solution of sodium chloride | Ethylene glycol fumarate | 5 | +0.56 | +1.3 |
| Xylenes | do | 5 | +0.13 | +0.80 |
| Ethyl acetate | Polyvinyl chloride | 4.5 | −1.04 | +2.2 |
| Acetone | Low pressure polyethylene | 5.5 | +1.70 | −4.4 |

(6) Although reference has been made above to the use of a cross-linkable polyester of specific composition, the degree of consistency of the gel being varied, it will be apparent that the invention may be carried out with a polyester of any other composition which can be gelled under similar conditions, as described, for example, in the aforesaid French Patent 1,113,814.

An example of the application of the method according to the invention to the manufacture of a particular product, namely fish containers used in harbor installations, will now be given by way of illustration only:

Fish containers for use in harbor installations are required to have great lightness, great rigidity, enabling full and empty containers to be stacked without deformation and to withstand the shocks of rough handling, insensitivity to fish products, base coloring enabling special batches to be distinguished if necessary, and a rapid manufacturing rate, say one container in 20 seconds.

A laminated sheet material suitable for the production of fish containers meeting these requirements, was manufactured from the polyester mentioned under (1) above, the consistency of the polyester gel being 0.100K, without mineral fillers, and a base fabric consisting of 2 glass fiber rovings each weighing 0.900 kg./m.$^2$, the ratio gel/fabric being 40/60.

After coating the base with the gel by means of trains of cold rollers, the faces of the coated web were dusted with powdered polyethylene produced by the low-pressure Ziegler process which had an intrinsic viscosity of 2.5, passed entirely through a No. 60 sieve, and had been dyed to the required color, 10% of powdered polyethylene being used based on the total weight of the laminate. This amount of powdered polyethylene was applied in two successive operations: (1) dusting with 6% by weight of the powder followed by calendering between cold rollers, and (2) dusting with 4% by weight of the powder without any re-calendering.

Coated webs thus obtained were stored for two months at a temperature below 15° C. They were then cut to the required dimensions and formed into fish containers in suitable molds; molding was effected at a temperature of 140° C. under a pressure of 20 kg./cm.$^2$ for 20 seconds. The fish containers removed from the mold were then kept in a conformator for 30 minutes where they were slowly cooled down to room temperature.

We claim:

1. A process for the production of laminated sheet materials in which a fibrous web is coated with an unsaturated cross-linkable polyester resin in the form of a stable, partially cross-linked gel, said process comprising dusting at least one face of the coated web with a finely divided solid organic powder.

2. A process according to claim 1, wherein dusting of the coated web is carried out in a plurality of stages, the dusted web being calendered at least once between said stages.

3. A process according to claim 1, which comprises the additional step of air drying the coated and dusted web at a temperature of from about 15° C. to about 70° C.

4. A process for the production of laminated sheet materials in which a fibrous web is coated with an unsaturated cross-linkable polyester resin in the form of a stable, partially cross-linked gel, said process comprising dusting at least one face of the coated web with a finely divided solid organic powder selected from the group consisting of fumaric and maleic polyesters with phthalic acid, prepolymerized allyl esters, melamine resins, phenol formaldehyde resins and urea formaldehyde resins.

5. A process according to claim 4, wherein the dusting of the web is carried out in a plurality of stages, the dusted web being calendered at least once between said stages.

6. A process according to claim 4, which comprises the additional step of air drying the coated and dusted web at a temperature of from about 15° C. to about 70° C.

7. A process for the production of laminated sheet materials in which a fibrous web is coated with an unsaturated cross-linkable polyester resin in the form of a stable, partially cross-linked gel, the process comprising dusting at least one face of the coated web with a finely divided solid organic powder composed of at least one thermoplastic resin which is fusible with the gel under the conditions required to complete polymerization of the polyester gel selected from the group consisting of polyethylene, polypropylene, copolymers of polyolefin and vinyl monomers, polyvinyl acetate, polyvinyl chloride, polyvinyl alcohol, cellulose acetate, polystyrene, polyformaldehyde, polyacrylonitrile, and polyacrylates.

8. A process according to claim 7, wherein the dusting of the web is carried out in a plurality of stages, the dusted web being calendered at least once between said stages.

9. A process according to claim 7 which comprises the additional step of air drying the coated and dusted web at a temperature of from about 15° C. to about 70° C.

10. Laminated sheet material comprising a fibrous web coated with a stable, partially cross-linked polyester resin gel, at least one face of the coated web having a finely divided organic solid powder dusted thereon rendering said face dry and non-adhesive.

References Cited by the Examiner
UNITED STATES PATENTS

| | | | |
|---|---|---|---|
| 1,558,440 | 10/1925 | Weber. | |
| 2,199,597 | 5/1940 | Renfrew et al. | 117—21 |
| 2,673,844 | 3/1954 | Gilcrease | 260—17.4 |
| 2,817,619 | 12/1957 | Bickel et al. | 154—110 |
| 2,861,910 | 11/1958 | Johnston et al. | 154—43 |
| 3,062,697 | 11/1962 | Novak | 156—178 |

EARL M. BERGERT, *Primary Examiner.*

CARL F. KRAFFT, *Examiner.*

H. L. GATEWOOD, H. F. EPSTEIN,
*Assistant Examiners.*